US 8,978,138 B2

(12) United States Patent
Mahvi

(10) Patent No.: US 8,978,138 B2
(45) Date of Patent: Mar. 10, 2015

(54) TCP VALIDATION VIA SYSTEMATIC TRANSMISSION REGULATION AND REGENERATION

(71) Applicant: Mehdi Mahvi, Irvine, CA (US)

(72) Inventor: Mehdi Mahvi, Irvine, CA (US)

( * ) Notice: Subject to any disclaimer, the term of this patent is extended or adjusted under 35 U.S.C. 154(b) by 246 days.

(21) Appl. No.: 13/838,274

(22) Filed: Mar. 15, 2013

(65) Prior Publication Data

US 2014/0283057 A1    Sep. 18, 2014

(51) Int. Cl.

| | |
|---|---|
| G06F 11/00 | (2006.01) |
| G06F 12/14 | (2006.01) |
| G06F 12/16 | (2006.01) |
| G08B 23/00 | (2006.01) |
| H04L 12/721 | (2013.01) |
| G06F 9/00 | (2006.01) |
| G06F 15/16 | (2006.01) |
| G06F 17/00 | (2006.01) |
| H04L 29/06 | (2006.01) |
| G06F 15/173 | (2006.01) |

(52) U.S. Cl.
CPC ........ *H04L 63/1408* (2013.01); *H04L 63/1441* (2013.01); *H04L 63/1458* (2013.01); *H04L 45/32* (2013.01)
USPC ................. 726/23; 726/11; 726/22; 713/153; 713/154; 709/224; 709/227

(58) Field of Classification Search
CPC .. H04L 45/32; H04L 63/1441; H04L 63/1458
USPC .................. 726/11–14, 22, 23; 713/153, 154; 709/223–229, 235
See application file for complete search history.

(56) References Cited

U.S. PATENT DOCUMENTS

| | | | |
|---|---|---|---|
| 6,104,717 A * | 8/2000 | Coile et al. ................... 370/401 |
| 6,725,378 B1 * | 4/2004 | Schuba et al. .................. 726/13 |
| 7,020,783 B2 | 3/2006 | Vange et al. | |
| 7,043,759 B2 | 5/2006 | Kaashoek et al. | |
| 7,464,410 B1 * | 12/2008 | Halasz et al. ................... 726/23 |
| 7,478,429 B2 | 1/2009 | Lyon | |
| 7,797,738 B1 | 9/2010 | Spatscheck et al. | |
| 7,921,462 B2 | 4/2011 | Rooney et al. | |
| 8,225,399 B1 | 7/2012 | Van der Merwe | |
| 8,370,937 B2 | 2/2013 | Gal et al. | |
| 2002/0032871 A1 | 3/2002 | Malan et al. | |

(Continued)

FOREIGN PATENT DOCUMENTS

| | | |
|---|---|---|
| EP | 1691529 A1 | 8/2006 |
| EP | 1705863 A1 | 9/2006 |

(Continued)

*Primary Examiner* — Evans Desrosiers
*Assistant Examiner* — Daniel Potratz
(74) *Attorney, Agent, or Firm* — San Diego IP Law Group LLP

(57) ABSTRACT

The present invention provides a technique for validating TCP communication between a client requesting resources and a server providing requested resources to protect the specified server from a denial of service attack wherein a plurality of clients initiate communication with a server, but do not complete the communication for the purpose of denying service to the server from other legitimate clients. Through systematic transmission regulation of TCP packets, an intermediary apparatus or set of apparatuses, can, to a high degree of certainty, validate client connections to protect the server from this saturated condition. The communication is then reproduced by the apparatus or apparatuses.

4 Claims, 3 Drawing Sheets

(56) References Cited

U.S. PATENT DOCUMENTS

| | | |
|---|---|---|
| 2002/0083175 A1 | 6/2002 | Afek et al. |
| 2002/0101819 A1 | 8/2002 | Goldstone |
| 2002/0103916 A1 | 8/2002 | Chen et al. |
| 2002/0120853 A1 | 8/2002 | Tyree |
| 2003/0014665 A1 | 1/2003 | Anderson et al. |
| 2003/0145232 A1 | 7/2003 | Poletto et al. |
| 2003/0145233 A1 | 7/2003 | Poletto et al. |
| 2003/0226032 A1 | 12/2003 | Robert |
| 2003/0236999 A1 | 12/2003 | Brustoloni |
| 2004/0008681 A1 | 1/2004 | Govindarajan et al. |
| 2006/0010389 A1 | 1/2006 | Rooney et al. |
| 2007/0044142 A1* | 2/2007 | Yoon et al. .......... 726/3 |
| 2012/0117646 A1* | 5/2012 | Yoon et al. .......... 726/22 |
| 2012/0260337 A1 | 10/2012 | Van der Merwe |
| 2013/0042322 A1 | 2/2013 | Yoon |

FOREIGN PATENT DOCUMENTS

| | | |
|---|---|---|
| EP | 2161898 A1 | 3/2010 |
| EP | 2257024 B1 | 11/2012 |

\* cited by examiner

TCP VALIDATION VIA SYSTEMATIC TRANSMISSION REGULATION AND REGENERATION

BACKGROUND OF THE INVENTION

1. Field of Invention

The invention relates generally to data network communications and more particularly to a technique for validating transmission control protocol (TCP) communication between a client requesting resources and a server providing requested resources to protect the specified server from a distributed denial of service (DDoS) attack.

2. Description of Related Art

In a traditional TCP 3-way handshake, the implementation of which is apparent to one of ordinary skill in the art, an initial packet with a TCP bit flag SYN is generated from a client to a server. A plurality of intermediary routing and switching devices assure the delivery of the data packet from the client to the server, and vice versa. The server generates a response packet with the TCP bit flags SYN and ACK set. The client then responds with a TCP ACK packet, establishing a completed TCP session.

Upon generation of the initial TCP SYN packet from the client, the server reserves and allocates a predetermined quantity of system resources, including processor, ram, and/or disk for the facilitation of this connection. The server maintains these resources for a predetermined period of time often as long as several minutes. As computer systems have limited resources, an attacker can take advantage of this situation by generating a large quantity of SYN packets to the server, exhausting all system resources. The server will then become unresponsive to legitimate client requests, thus denying service to legitimate clients. This is one embodiment of a "denial of service" attack. Generally, prior art systems "detect" denial of service conditions, but fail to actually mitigate this undesirable situation.

United States Patent Application Publication No. 2003/0226032 to Robert, the disclosure of which is incorporated by reference herein in its entirety, describes a mechanism for detecting denial of service attacks. A probabilistically determined portion of input packets of a connection are processed using a hash function to determine whether the packets belong to the flow initiated by a TCP SYN packet. A drawback of Robert is that it is dependent on the server handling traffic in advance of the flow detection. Once the server has been overloaded, the denial of service condition has been met.

U.S. Pat. No. 7,921,462 to Rooney et al. ("Rooney"), the disclosure of which is incorporated by reference herein in its entirety, describes a technique for detecting DDoS attacks within the Internet by sampling packets at a point or points in Internet backbone connections to determine a packet metric parameter. The packet metric parameter which might comprise the volume of packets received is analyzed over selected time intervals with respect to specified geographical locations in which the hosts transmitting the packets are located. The expected behavior can be employed to identify traffic distortions revealing a DDoS attack. A drawback of Rooney is that it is unable to prevent a "syn flood" attack as no single packet will meet the thresholds set.

United States Patent Application Publication No. 2002/0120853 to Tyree, the disclosure of which is incorporated by reference herein in its entirety, describes scripted distributed denial-of-service (DDoS) attack discrimination using turing, i.e., intelligence, tests. A drawback of Tyree is that it cannot be automatically implemented on systems where background communication is necessary, such as simple mail transport protocol (SMTP), and is not plausible in today's Internet topology. Moreover, turing tests are cumbersome for users.

United States Patent Application Publication No. 2004/0008681 to Govindaraj an et al. ("Govindaraj an"), the disclosure of which is incorporated by reference herein in its entirety, describes a technique for delaying allocation of resources until after the TCP three-way handshake is successfully completed. A drawback of Govindarajan is that implementation in an apparatus is complicated and performance scalability is difficult to achieve in asymmetric networks.

United States Patent Application Publication No. 2002/0103916 to Chen et al. ("Chen"), the disclosure of which is incorporated by reference herein in its entirety, describes architecture for thwarting denial of service attacks on a victim data center. The system includes a first plurality of monitors that monitor network traffic flow through the network. A central controller receives data from the plurality of monitors, over a hardened, redundant network. A drawback of Chen is that it cannot protect against "spoofed" attacks.

SUMMARY OF THE INVENTION

The present invention overcomes these and other deficiencies of the prior art by utilizing a simplistic approach that takes advantage of the inherent design philosophy of transmission control protocol (TCP). In TCP communication, an initiating connection is performed by a TCP packet with the SYN bit flag set. When the initial SYN packet is ignored by the receiving server, the client retransmits further SYN packets. The client, depending on the operating system configuration, can transmit several SYN packets. By blocking the transmission of this packet at an intermediary apparatus, storing the information, and awaiting for a second or third TCP SYN packet, the client is validated with a high degree of certainty to be legitimate. Conversely, if too many TCP SYN packets are received by the client or intermediary apparatus, the present invention will know, with a high degree of certainty, that the requesting client is illegitimate and can be blocked.

The present invention solves the problem of a denial of service condition by validating the legitimate authenticity of connections, and is extremely simple to implement in a software system on an apparatus in a network environment. Thus, the apparatus can achieve high performance with relative ease of implementation. The software system can also be replicated into a global network utilizing a state session sharing mechanism.

In an embodiment of the invention, a method for validating transmission control protocol (TCP) packets during a communications session comprises the steps of: intercepting a TCP packet; checking a hash table to determine if a hash entry exists for the intercepted TCP packet, if no hash entry exists in the hash table for the intercepted TCP packet then generating a hash entry for the intercepted TCP packet by hashing a source IP address, a source port, a destination IP address, and a destination port associated with the intercepted TCP packet, and storing a session state associated with the intercepted TCP packet in the hash table as NONE, if a hash entry exists in the hash table for the intercepted TCP packet then retrieving the session state associated with the intercepted TCP packet; determining if the session state is designated as blacklisted, if the session state is designated as blacklisted then discarding the intercepted TCP packet, if the session state is not designated as blacklisted then identifying a TCP packet flag associated with the intercepted TCP packet, if the TCP packet flag is identified as SYN then determining if the session state is designated as established, if the session state is designated as established then replicating the intercepted TCP packet and forwarding the replicated intercepted TCP packet to a server, if the session state is not designated as established then determining a SYN count associated with the intercepted TCP packet, if the determined SYN count is equal to one then storing the session state associated with the intercepted TCP packet in the hash table as OPEN1 and discarding the intercepted TCP packet, if the determined SYN count is equal to two or three then storing the session state associated with the intercepted TCP packet in the hash table as OPEN2 and replicating the intercepted TCP packet and forwarding the replicated intercepted TCP packet to a server, if the determined SYN count is equal to three or more then storing the session state associated with the intercepted TCP packet in the hash table as blacklisted and discarding the intercepted TCP packet, if the TCP packet flag is not identified as SYN then determining if the session state is designated as established, OPEN1, OPEN2, or NONE, if the determined session state associated with the intercepted TCP packet is NONE or OPEN1 then discarding the intercepted TCP packet, if the determined session state associated with the intercepted TCP packet is established or OPEN2 then replicating the intercepted TCP packet and forwarding the replicated intercepted TCP packet to a server. The method further comprising applying a predetermined timeout to the communications session, wherein if communication has not taken place during the predetermined timeout, the session is expired.

An advantage of the present invention is its simplicity of implementation. As the present invention does not necessitate the interception of egress traffic, it can be implemented with relative ease. Network asymmetric is no longer a problem because of this.

Another advantage is that it provides a very high level of security against invalid client connections. In testing, a significant portion of attacks utilize methods, procedures, patterns, and fingerprints that are thwarted by the present invention.

Another advantage of the present invention is the versatility of the hash function. Utilizing different hash functions, different advantages based on the advantages the different hash functions provide. Some hash functions provide advantages for disparate sets, while others provide advantages for similar sets. The purpose of the hash function can dictate the application of the present invention.

Another advantage is that the memory footprint required by the present invention is fairly low as not much information is stored on each state session. The total state session information saved is 32 bits for source address, 32 bits for destination address, 16 bits for source port address, 16 bits for destination port address, 8 bits for a state identifier, and 8 bits for a SYN counter.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, and the advantages thereof, reference is now made to the ensuing descriptions taken in connection with the accompanying drawings briefly described as follows.

DETAILED DESCRIPTION OF EMBODIMENTS

Figure 1:
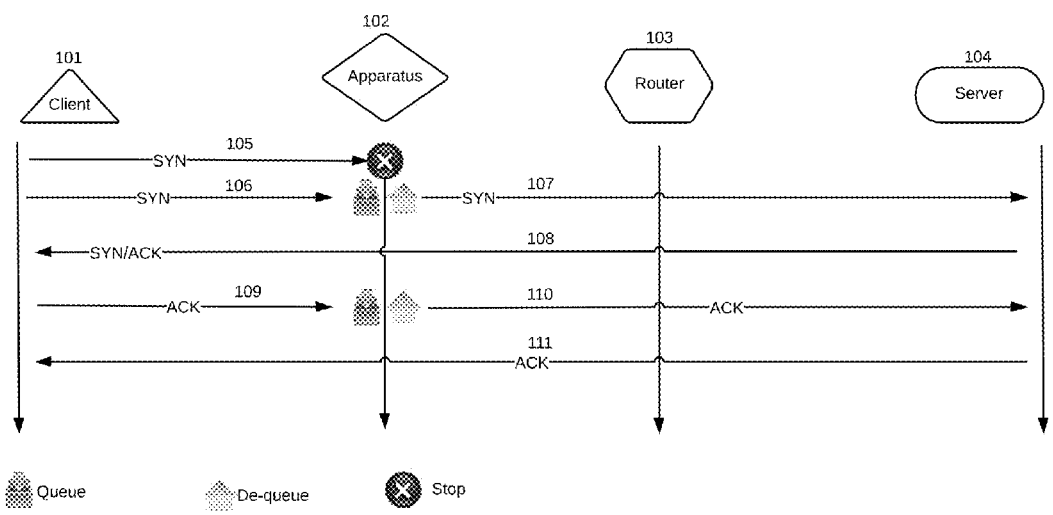
FIG. 1 illustrates a communication system according to an embodiment of the invention.

Further features and advantages of the invention, as well as the structure and operation of various embodiments of the invention, are described in detail below with reference to the accompanying FIGS. 1-3, wherein like reference numerals refer to like elements.

The present invention may be implemented as software residing and executing on one or more computers, i.e., apparatuses. The apparatus or set of apparatuses receive network traffic and generate control messages to dictate the flow of particular traffic. The network traffic that is passed through an apparatus consists of all network traffic that is desired to be securely managed. This can include network all network traffic or a particular subset off network traffic such as network traffic destined to a particular subsection of the network. Network traffic can originate in any point of presence that the service provider or content provider resides. The apparatus itself also controls the flow of traffic to limit, restrict, or allow such traffic communication based on the control logic described herein.

FIG. 1 illustrates a communication system according to an embodiment of the invention. The communication system comprises a client 101, an apparatus 102 implementing logic as described herein, a router 103, and a server 104. The implementation of client 101, router 103, and server 104 is readily apparent to one of ordinary skill in the art.

Figure 2:
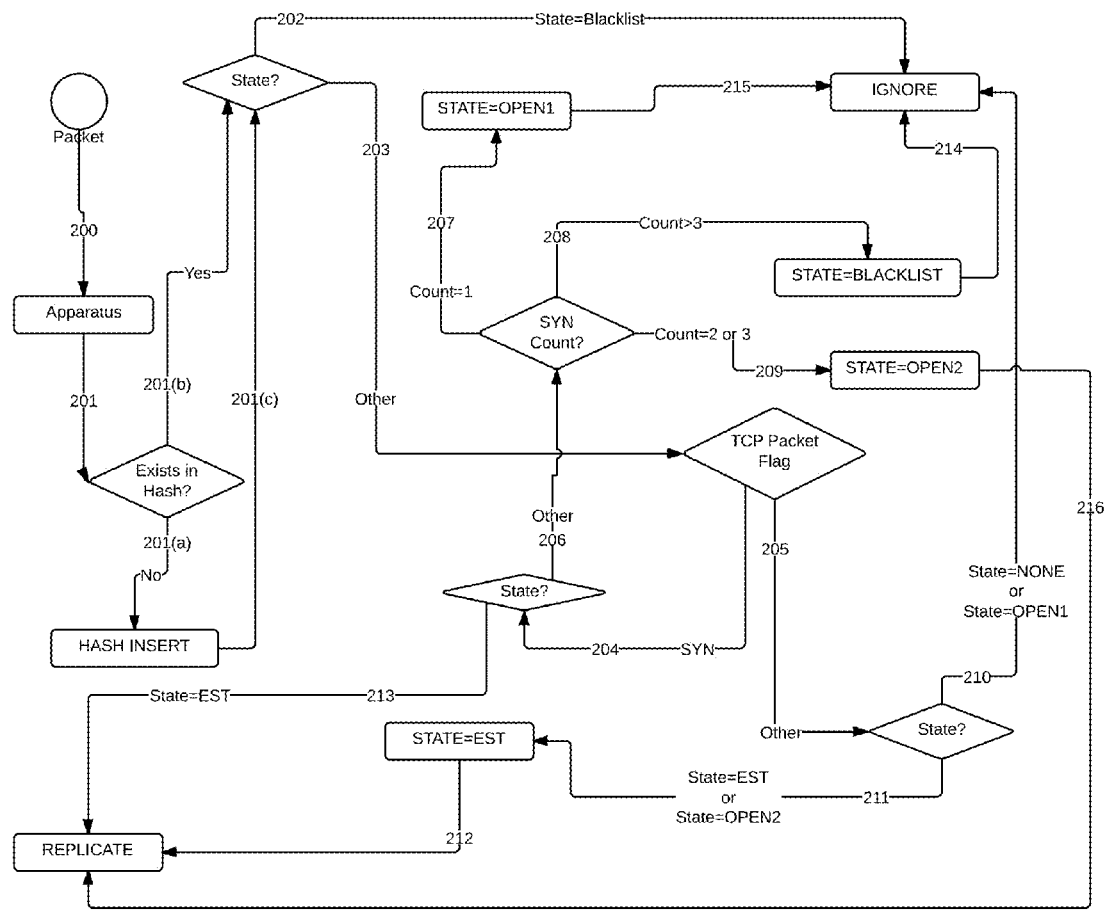
FIG. 2 illustrates a TCP validation method according to an embodiment of the invention.

FIG. 2 illustrates a TCP validation method according to an embodiment of the invention. In operation, a packet originates and is intercepted by apparatus 102 at step 200. The packet originates from client 101, which transmits a TCP SYN packet 105 to server 104, intercepted by apparatus 102. At step 201, a session state is either conceived for the packet and inserted into a hash table, or is retrieved from the existing state session in the hash table. This session state is based on a hash entry for the source IP address, source port, destination IP address, and destination port of the packet. The session state determines the current state of the session and can be of type "OPEN1", "OPEN2", "EST", or "BLACKLIST". If the state of the session is blacklisted, the apparatus 102 ignores further processing on the packet at step 202. This hash can be accessed again at any point to retrieve data regarding the session. An applicable and configurable timeout is applied to this session in step 201 based on the environmental needs and requirements this methodology or apparatus is deployed in, often about 24 hours, at which point if communication has not taken place for specified time, the session is expired to free up memory resources. This session timeout functionality can be implemented at step 201 where the system checks for the existence of the packet in an existing session. If the timeout period has expired, the function would not return an existing hash entry. The hash algorithm usable for this invention is any type of available hash algorithm, the identification and implementation of which is apparent to one of ordinary skill in the art. No specific algorithm is necessary for proper functionality. A usable hash function is 'perfect hashing'. The hashing function needs to be able to locate a record with certainty. The hashing function needs to support the hash table identifiers source IP, source port, destination IP, and destination port. The hash function needs to support an additional field to maintain timeout.

Apparatus 102 processes the packet at steps 200, 201, and 202. If the state of the session is Other 206, and if the SYN count is equal to one at step 207, apparatus 102 sets state to "OPEN1" and ignores any further processing on the packet 215. If the state of the session is Other 206 and if SYN count is equal to 2 or 3 at step 209, the state is set to OPEN2 and the packet is replicated to the end server 104 via SYN commands 106 and 107. If the SYN count is greater than 3 at step 208, the state is set to blacklist and further processing is ignored.

The server 104 responds with a TCP SYNACK packet 108 to the client 101. The client 101 transmits a TCP ACK packet 109 that is intercepted by apparatus 102. If the state is blacklist at step 202, ignore further processing of the packet. If the state is not blacklist at step 203, apparatus 102 processes the packet type. If the packet is not a SYN packet, the apparatus 102 determines the state at step 205. If the packet is of state NONE or OPEN1 210, the packet is ignored. If the packet is of state EST or OPEN2 211, the apparatus 102 sets state to EST and replicates the packet at packets 109, 110, and 212. No further processing is necessary at this point as necessary TCP packets have been replicated for effective communication. This design encompasses all TCP packets.

In an embodiment of the invention, apparatus 102 resides on a network, capable of receiving and transmitting network communication traffic, while this device, or another device, prevents the standard flow of this communication traffic between the client 101 and the server 104. Thus, apparatus 102 serves as a transparent device manipulating the migration of data packets from one portion of a network to another in the interest of providing network security for a plurality of systems on said network.

In another embodiment of the invention, apparatus 102 is replicated into a multi-location mitigation system such as a global mitigation system. Each node performs the necessary functionality to provide protection to a large subset of end servers.

In another embodiment of the invention, apparatus 102 is a module on a computer system that performs these tasks to mitigate attempted denial of service against that single computer system to protect its resources.

A spoofed attack is an Internet flood where a plurality of systems generate an attack wherein the source IP address of the attack is malformed such that the address does not belong to the specific system generating the attack. A system can generate spoofed packets at a high data rate as the response to the generated packets do not reach the system. This is because the source IP addresses that the attacking system is utilizing for the attack do not belong to it. Thus, the responses, as generated by the remote systems arrive at other systems across the Internet. This behavior is prevalent in many attacks currently taking place on the Internet. Many intermediary network devices managed by network operators do not inhibit this form of traffic.

When a TCP SYN packet is received by a system, a socket is created based on some identifying information, often utilizing the source IP address, source port, destination IP address, and destination port. This socket is unique to the connection with these identifying characteristics, or other similar identifying characteristics. A socket utilizes system resources such as memory and processing power.

During a spoofed TCP SYN flood, a plurality of systems transmit, at a sufficient data rate, transmit TCP SYN packets with spoofed source IP addresses against a target remote server, often with the intent to create a denial of service condition. When the remote system receives these SYN packets, it opens a socket by allocating memory and resources to accept the packet, and attempts to respond to them with a TCP SYNACK to proceed with TCP 3 way handshake. The remote system does not time these sockets out for some predetermined time based on the operating system and the administrative settings, often about 30 seconds. The system generating the attacks does not see the TCP SYNACK response. It simply continues sending TCP SYN packets to the remote server until the remote server is incapable of processing additional TCP SYN packets as all its resources have been exhausted.

In FIG. 2, this methodology prevents this condition by blocking the first TCP SYN packet. When this first TCP SYN packet is blocked, because all further packets are different, the attack no longer impacts the receiving system because the receiving system never sees these TCP SYN packets. The attack has been mitigated.

During a standard TCP SYN flood, a plurality of systems transmit, at a sufficient data rate, TCP SYN packets against a target remote server, often with the intent to create a denial of service condition. The source IP addresses of these systems are their real IP addresses. Thus, the total capacity of the attack is directly correlated with the number of systems under the control of the attacker.

In FIG. 2, this methodology prevents this condition by blocking the first TCP SYN packet, fourth TCP packet, and consecutive TCP packets after that. When the attacking system generates the second and third TCP SYN packets, the methodology sets the session state for these packets to OPEN1, then replicates these packets to the end system. The end system responds with a TCP SYNACK to the attacking system. The attacking system ignores these as it is not actually intending to open a TCP connection with the target system. It continues sending TCP SYN packets, at which point the methodology sets the state to BLACKLIST because the SYN count exceeds 3. Once in blacklist, no further processing is performed on any other received TCP SYN packets. The attack has been mitigated.

Figure 3:
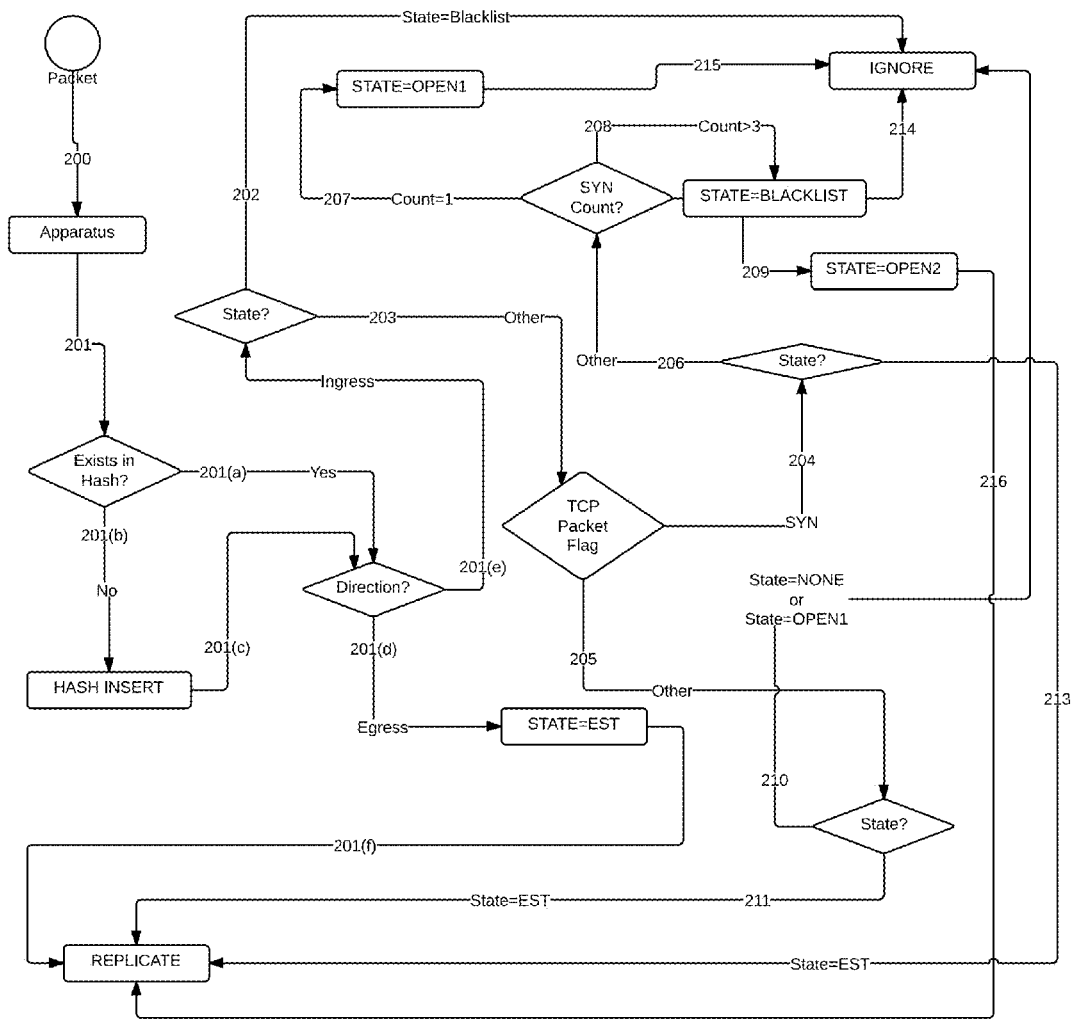
FIG. 3 illustrates a TCP validation method according to another embodiment of the invention.

FIG. 3 illustrates a TCP validation method according to another embodiment of the invention. The difference in this environment begins at steps 201(d), 201(e) and 201(f). The system, upon detection of an egress packet sets the state to EST. If an egress packet is not detected, the state is never set to EST and communication does not continue. As we can see in 205, we check for state, and if the state is EST 211, we replicate the packet. By doing this, the apparatus makes sure that the server wants to communicate with the client. If the server has some local security policy to reject the client, this apparatus or methodology will honor this by virtue of design and not validate the client.

An advantage of the embodiment of FIG. 3 is that monitors egress traffic from the server 104 so as to verify that the server is in fact validating the connection.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

What is claimed is:

1. A method for validating transmission control protocol (TCP) packets during a communications session, the entire method implemented on a computer processor and comprising the steps of:
    intercepting a TCP packet;
    checking a hash table to determine if a hash entry exists for the intercepted TCP packet;
    if no hash entry exists in the hash table for the intercepted TCP packet then:

generating a hash entry for the intercepted TCP packet by hashing a source IP address, a source port, a destination IP address, and a destination port associated with the intercepted TCP packet; and designating a session state associated with the intercepted TCP packet in the hash table as "NONE", if a hash entry exists in the hash table for the intercepted TCP packet then:

retrieving the session state associated with the intercepted TCP packet;

determining if the session state is designated as blacklisted ("BLACKLIST"), if the session state is designated as "BLACKLIST" then:

discarding the intercepted TCP packet;

if the session state is not designated as "BLACKLIST" then:

identifying a TCP packet flag associated with the intercepted TCP packet, if the TCP packet flag is identified as SYN then:

determining if the session state is designated as established ("EST"), if the session state is designated as "EST" then:

replicating the intercepted TCP packet and forwarding the replicated intercepted TCP packet to a server;

if the session state is not designated as "EST" then:

determining a SYN count associated with the intercepted TCP packet, if the determined SYN count is equal to one then designating the session state associated with the intercepted TCP packet in the hash table as "OPEN1" and discarding the intercepted TCP packet, if the determined SYN count is equal to two or three then designating the session state associated with the intercepted TCP packet in the hash table as "OPEN2" and replicating the intercepted TCP packet and forwarding the replicated intercepted TCP packet to the server, if the determined SYN count is greater than three then designating the session state associated with the intercepted TCP packet in the hash table as "BLACKLIST" and discarding the intercepted TCP packet; and if the TCP packet flag is not identified as SYN then:

determining if the session state is designated as "EST", "OPEN1", "OPEN2", or "NONE", if the determined session state associated with the intercepted TCP packet is designated as "NONE" or "OPEN1" then discarding the intercepted TCP packet, if the determined session state associated with the intercepted TCP packet is designated as "EST" or "OPEN2" then designating the session state associated with the intercepted TCP packet in the hash table as "EST" and replicating the intercepted TCP packet and forwarding the replicated intercepted TCP packet to the server.

2. The method of claim 1, wherein the TCP packet flag is set as one of ACK, RST, FIN, URG, PUSH, or SYN.

3. The method of claim 1, wherein the session state determines the current state of the communications session and is at least designated as a type selected from a group of: "NONE", "OPEN1", "OPEN2", "EST", or "BLACKLIST".

4. The method of claim 1, further comprising applying a predetermined timeout to the communications session, wherein if communication has not taken place during the predetermined timeout, the communications session is expired.

* * * * *